UNITED STATES PATENT OFFICE.

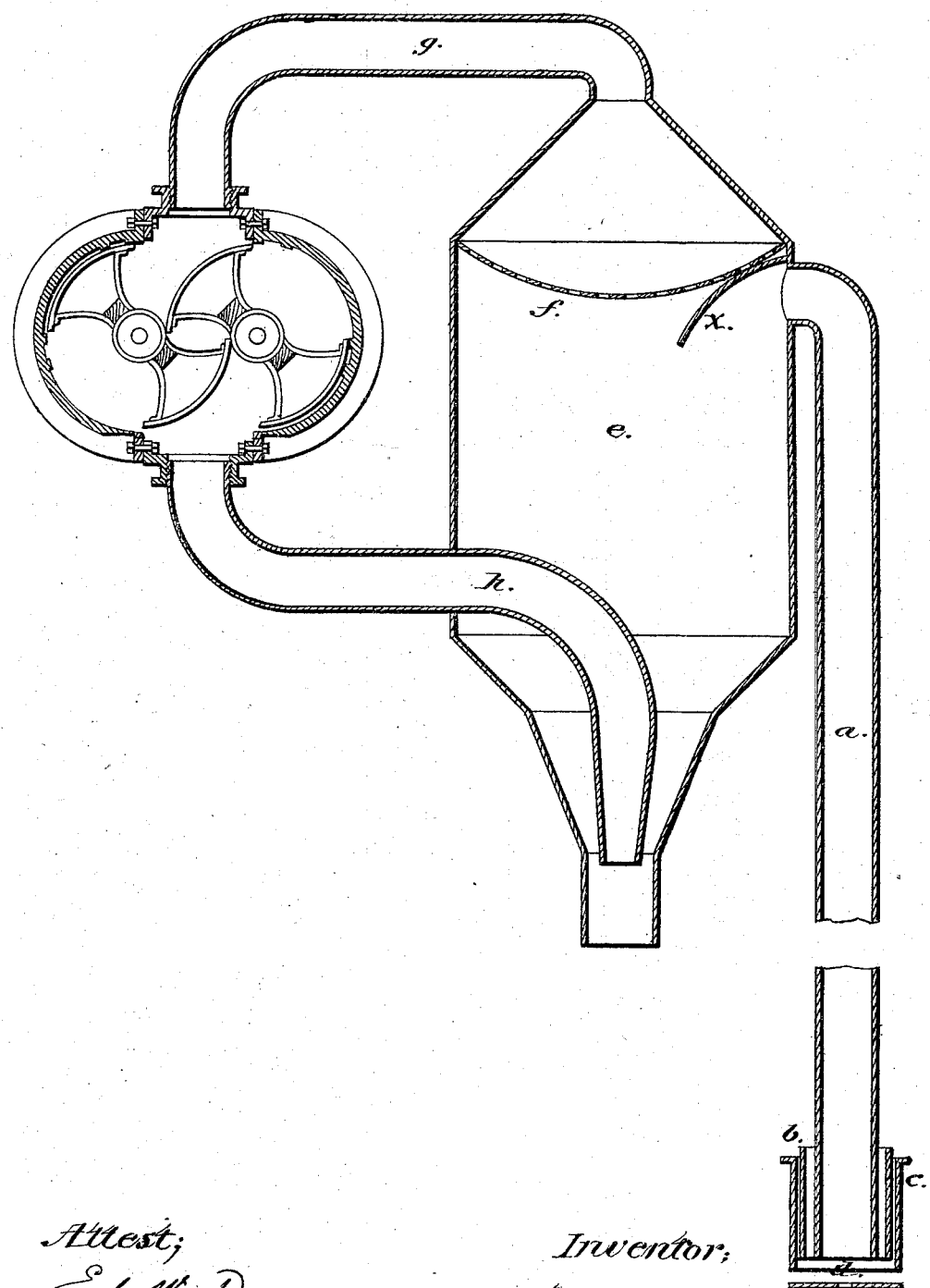

HELEM MERRILL, OF BROOKLYN, NEW YORK.

IMPROVEMENT IN GRAIN-ELEVATORS.

Specification forming part of Letters Patent No. 138,175, dated April 22, 1873; application filed September 28, 1872.

*To all whom it may concern:*

Be it known that I, HELEM MERRILL, of Brooklyn, in the county of Kings and State of New York, have invented certain new and useful Improvements in Grain-Elevators, of which the following is a specification:

Nature and Objects of the Invention.

The said invention relates to the elevation of grain by means of the inductive power of a current of air; and it consists of a pipe, through which passes a current of air produced by exhaustion, the lower end of the pipe being thrust into the grain and provided with suitable means for the regulation of the opening through which the entrance of the grain is effected. The ascending current of air carries with it the grain with which it enters the mouth of the pipe. The upper end of the pipe delivers into a receptacle in which the grain is deposited while the air passes through a strainer and a suitable pipe to the blower or exhausting engine. After the air has passed through the blower and has become a blast, it is again brought to the receptacle for the purpose of expelling the grain through a suitable nozzle at the bottom. If it were not for this use of the blast it would be necessary to retain the grain until the receptacle had become filled, and to then shut off the blower while the grain was being removed, as any opening into the receptacle would impair the partial vacuum and break the ascending current in the pipe. This difficulty could be obviated by using a pair of receptacles fitted with valves, so that they would be alternately filled and emptied with a continuous current running through the pipe and delivering the grain from either the one or the other of the receptacles. By the use of a blast, however, the grain may be carried from a single receptacle by induction without admitting air to interfere with the vacuum.

Description of the Drawing.

The drawing represents in outline the section of an apparatus according to my invention, with the lift-pipe broken for the convenience of illustration.

The lower end of the lift-pipe $a$, which is thrust into the grain, is provided with an open collar or loose sleeve, $b$, upon which slides a tight sleeve or collar, $c$, for the purpose of regulating the open distance between the bottom of the pipe and the stationary base-plate $d$. The lift-pipe $a$ delivers to the receptacle $e$, below the strainer $f$, the meshes of which will not permit the passage of the grain, and also below the deflector $x$, which directs the grain downward. The exhaust-pipe $g$ leads to the blower, and the blast-pipe $h$ has a conical termination within the conically-formed open bottom of the receptacle.

Claims.

1. The arrangement of the apparatus for the elevation of grain or other similar material by the induction of an uninterrupted current of air, substantially as described.

2. The combination, with the lift-pipe, of the adjustable cylindrical regulating-valve having an air-space between the pipe and valve-cylinder.

3. The combination of the suction-pipe $g$ and blast-discharging pipe $h$ with the receptacle $e$, when their terminuses are in opposite ends of the receptacle, as and for the purpose specified.

HELEM MERRILL.

Witnesses:
NATHAN LEWIS,
WM. KEMBLE HALL.